US006984678B2

(12) United States Patent
Nakagawa et al.

(10) Patent No.: US 6,984,678 B2
(45) Date of Patent: Jan. 10, 2006

(54) THERMOPLASTIC RESIN COMPOSITION AND MOLDED ARTICLES

(75) Inventors: Matsuyoshi Nakagawa, Sodegaura (JP); Takaaki Miyoshi, Kimitsu (JP); Kazuya Noda, Chigasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/478,413

(22) PCT Filed: May 21, 2002

(86) PCT No.: PCT/JP02/04913

§ 371 (c)(1),
(2), (4) Date: Nov. 21, 2003

(87) PCT Pub. No.: WO02/094936

PCT Pub. Date: Nov. 28, 2002

(65) Prior Publication Data

US 2004/0143061 A1 Jul. 22, 2004

(30) Foreign Application Priority Data

May 24, 2001 (JP) .............................. 2001-156000
Feb. 7, 2002 (JP) .............................. 2002-030550

(51) Int. Cl.
*C08K 5/42* (2006.01)
(52) U.S. Cl. ........................ 524/166; 524/505; 525/89; 525/92 B; 525/92 D
(58) Field of Classification Search ................. 525/89, 525/92 B, 92 D; 524/166, 505
See application file for complete search history.

(56) References Cited

U.S. PATENT DOCUMENTS

| 3,379,792 | A | | 4/1968 | Pinholt et al. |
| 4,960,825 | A | | 10/1990 | Meer |
| 5,104,937 | A | | 4/1992 | Saito et al. |
| 5,109,052 | A | | 4/1992 | Kasai et al. |
| 5,134,196 | A | | 7/1992 | Meer |
| 5,262,480 | A | * | 11/1993 | Lee, Jr. ..................... 525/92 D |
| 6,797,766 | B2 | * | 9/2004 | Cordova ..................... 524/505 |

FOREIGN PATENT DOCUMENTS

| JP | 64-79258 A | 3/1989 |
| JP | 2-11656 A | 1/1990 |
| JP | 6-157895 A | 6/1994 |
| JP | 6-240130 A | 8/1994 |
| JP | 7-179747 A | 7/1995 |
| JP | 8-217972 A | 8/1996 |

* cited by examiner

*Primary Examiner*—Ana Woodward
(74) *Attorney, Agent, or Firm*—Birch, Stewart, Kolasch & Birch, LLP

(57) ABSTRACT

The present invention provides a thermoplastic resin composition characterized by (1) having an excellent appearance even when it is extruded into a molded piece at a high output, (2) retaining its impact strength even after heat exposure, and (3) having less foreign matter generation at the time of production.

According to the present invention, in a composition comprising a polyamide, a polyphenylene ether and a block copolymer, a mixture of a block copolymer having a number average molecular weight of less than 120,000 and a block copolymer having a number average molecular weight of 120,000 or more is used as the block copolymer.

9 Claims, No Drawings

THERMOPLASTIC RESIN COMPOSITION AND MOLDED ARTICLES

This application is the national phase under 35 U.S.C. § 371 of PCT International Application No. PCT/JP02/04913 which has an International filing date of May 21, 2002, which designated the United States of America.

TECHNICAL FIELD

The present invention relates to a thermoplastic resin composition characterized by (1) having an excellent surface appearance even when it is extruded into a molded piece at a high output, (2) retaining its Izod impact strength, even after heat exposure (annealing), and (3) having less foreign matter (black spot) generation at the time of production.

The thermoplastic resin composition in accordance with the present invention can be suitably used in various fields, such as electric and electronic parts, OA parts, machinery parts and electrical device parts or interior/exterior parts of a motorbike or car.

BACKGROUND ART

A polyphenylene ether has been extensively used because of superiority in its mechanical properties, electrical properties and heat resistance and further superiority in its dimensional stability. However, it is inferior in its molding processability when used singly. In order to improve the molding processability, JP-B-45-997 proposes a technique, wherein a polyamide is blended therewith. At present, such a material has come to be extensively used.

A technique of adding an impact improving material to a polymer alloy comprising a polyphenylene ether and a polyamide in order to impart impact resistance is disclosed in, for example, JP-A-2-11656.

JP-A-64-81852 and JP-A-2-58563 disclose a technique, wherein two kinds of elastomers, namely, an ABA type tri-block copolymer and an AB type di-block copolymer are blended with each other, to improve impact resistance. Further, JP-A-6-240130 discloses a technique, wherein more than one block copolymer having different weight ratios of an aromatic vinyl compound block are blended, thereby improving molding processability, mechanical properties and heat resistance.

In recent years, the needs from the market for the polyamide/polyphenylene ether alloy have been diversified and have reached a high level.

For example, a relay box material, which is one of the car electrical device parts, is installed in a high temperature environment in an engine room and, therefore, has been strongly demanded to maintain its impact strength even after heat exposure for a long period of time. In addition, under a trend toward a thinner relay box material for the production of a lightweight car, foreign matter (called a black spot and mainly composed of a raw material carbide), which is generated and incorporated at the time of its production, is apt to cause a problem such as short circuits. Therefore, the reduction of the foreign matter has been strongly demanded.

Further, within recent years, the extruder has been remarkably improved in its performance (i.e. megacompounder), so that the output at the time of extrusion can be far increased.

Since the polyamide/polyphenylene ether alloy is a polymer alloy accompanying a chemical reaction, however, its compatibility is altered by the increase of the output, to rapidly deteriorate the surface appearance after molding. As a result, there clearly appears a problem that the output in the extrusion of the polyamide/polyphenylene ether alloy cannot be sufficiently increased, and as a result, the productivity is decreased.

These problems, that have recently appeared, cannot be sufficiently solved by the above-mentioned conventional techniques, resulting in the problem that extensive applicability of the polyamide/polyphenylene ether alloy in various fields is hindered.

An object of the present invention is to solve these problems of the polyamide/polyphenylene ether alloy at the same time, namely the deterioration of surface appearance in a molded piece when extruded at a high output, deterioration in impact resistance after heat exposure and occurrence of foreign matter at the time of production.

DISCLOSURE OF INVENTION

The present inventors have undertaken extensive studies to solve the above-mentioned problems. As a result, it has been found that a thermoplastic resin composition characterized by (1) having an excellent appearance, even when it is extruded into a molded piece at a high output, (2) retaining its impact strength, even after heat exposure, and (3) having less foreign matter generation at the time of production, can be obtained by using more than one block copolymer having different molecular weights at the same time.

That is, the present invention relates to a thermoplastic resin composition comprising:

(A) 50 to 90 parts by weight of a polyamide,
(B) 50 to 10 parts by weight of a polyphenylene ether, and
(C) 1 to 35 parts by weight of a block copolymer comprising at least one polymer block mainly composed of an aromatic vinyl compound and at least one polymer block mainly composed of a conjugated diene compound, and/or a hydrogenated block copolymer of the block copolymer, wherein the weight is based on 100 parts by weight of the sum of (A) and (B), wherein the component (C) is a mixture of a block copolymer having a number average molecular weight of less than 120,000 (C1) and a block copolymer having a number average molecular weight of 120,000 or more (C2).

PREFERRED EMBODIMENTS FOR CARRYING OUT THE INVENTION

Respective components that can be used in the present invention are described in detail hereinbelow.

The polyamide that can be used in the present invention as the component (A) may be any polymer, as long as it contains an amide bond {—NH—C(=O)—} in its main chain.

In general, the polyamide can be obtained by ring-opening polymerization of a lactam, poly-condensation between a diamine and a dicarboxylic acid or polycondensation of an aminocarboxylic acid and the like. The polyamide in the present invention is not limited thereto.

The above-mentioned diamine can be generally divided into aliphatic, alicyclic and aromatic diamines, and specific examples thereof include tetramethylenediamine, hexamethylenediamine, undecamethylenediamine, dodecamethylenediamine, tridecamethylenediamine, 2,2,4-trimethylhexamethylene-diamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylylenediamine and p-xylylenediamine.

The dicarboxylic acid can be generally divided into aliphatic, alicyclic and aromatic dicarboxylic acids, and specific examples thereof include adipic acid, suberic acid, azelaic acid, sebacic acid, dodecanoic diacid, 1,1,3-tridecanoic diacid, 1,3-cyclohexanedicarboxylic acid, terephthalic acid, isophthalic acid, naphthalenedicarboxylic acid and dimer acid.

Specific examples of the lactam include ε-caprolactam, enanthlactam and ω-laurolactam.

Specific examples of the aminocarboxylic acid include ε-aminocaproic acid, 7-aminoheptanoic acid, 8-aminooctanoic acid, 9-aminononanoic acid, 11-aminoundecanoic acid, 12-aminononanoic acid and 13-aminotridecanoic acid.

In the present invention, any copolymerized polyamides obtained by polycondensation of any one of these lactams, diamines, dicarboxylic acids or ω-aminocarboxylic acids or a mixture of two or more thereof can be used.

Further, in the present invention, any copolymerized polyamides obtained by first polymerizing these lactams, diamines, dicarboxylic acids or ω-aminocarboxylic acids in a polymerization reactor to an extent where an oligomer having a low molecular weight is formed, and then processing it in an extruder or the like to have a high molecular weight, can be suitably used.

Examples of the polyamide resin (A) particularly advantageously used in the present invention include polyamide 6, polyamide 6, 6, polyamide 4, 6, polyamide 11, polyamide 12, polyamide 6, 10, polyamide 6, 12, polyamide 6/6, 6, polyamide 6/6, 12, polyamide MXD (m-xylylenediamine), 6, polyamide 6, T, polyamide 6, I, polyamide 6/6, T, polyamide 6/6, I, polyamide 6, 6/6, T, polyamide 6, 6/6, I, polyamide 6/6, T/6, I, polyamide 6, 6/6, T/6, I, polyamide 6/12/6, T, polyamide 6, 6/12/6, T, polyamide 6/12/6, I and polyamide 6, 6/12/6, I. It is permitted to use polyamides obtained by copolymerizing more than one polyamide in an extruder or the like. Of these, preferred polyamides are polyamide 6, polyamide 6, 6, polyamide 6/6, 6 and a mixture thereof, and the most preferred is polyamide 6, 6.

The polyamide resin (A) used in the present invention has a number average molecular weight of preferably from 5,000 to 100,000, and more preferably from 10,000 to 30,000.

The polyamide resin (A) in the present invention is not limited to these polyamides, and may be a mixture of more than one polyamide resin having different molecular weights. For example, there can be mentioned a mixture of a low molecular weight polyamide having a number average molecular weight of 10,000 or less and a high molecular weight polyamide having a number average molecular weight of 30,000 or more, and a mixture of the low molecular weight polyamide having a number average molecular weight of 10,000 or less and a conventional polyamide having a number average molecular weight of about 15,000.

The terminal groups of the polyamide participate in the reaction with a functional polyphenylene ether.

Usually, the polyamide resin has an amino group and a carboxyl group as the terminal groups. Generally speaking, an increase of carboxyl group concentration lowers impact resistance but raises flowability, while an increase of amino group concentration raises impact resistance but lowers flowability.

In the present invention, a ratio of such terminal groups in terms of amino group/carboxyl group concentration ratio is preferably from 9/1 to 1/9, more preferably from 8/2 to 1/9, and much more preferably from 6/4 to 1/9.

The concentration of the terminal amino group is preferably at least 10 milli-equivalent/kg, and more preferably 30 milli-equivalent/kg or more.

Such terminal groups of a polyamide resin can be controlled in a known manner obvious to a person skilled in the art. For example, at the time of polymerization to obtain the polyamide resin, at least one compound selected from diamine compounds, monoamine compounds, dicarboxylic acid compounds and monocarboxylic acid compounds is added so as to obtain a pre-determined terminal group concentration.

In the present invention, a metal stabilizer, which is known to be used for improving heat stability of the polyamide resin, such as those described in JP-A-1-163262, can be used without any problem.

Particularly preferable examples of the metal stabilizer are CuI, $CuCl_2$, copper acetate and cerium stearate. In addition, alkali metal halides, such as potassium iodide and potassium bromide and the like, can be also suitably used. Naturally, it is permitted that more than one stabilizer is used at the same time.

The metal stabilizer, the alkali metal halide or a combination thereof may be added in an amount of preferably from 0.001 to 1 parts by weight, based on 100 parts by weight of the polyamide resin.

Besides the metal stabilizer mentioned above, in the present invention, a known organic stabilizer can be used without any problem. Examples of the organic stabilizer include hindered phenol antioxidants, such as IRGANOX 1098; phosphorus processed heat stabilizers, such as IRGAFOS 168; lactone processed heat stabilizers, such as HP-136; sulfur heat resistant stabilizers; and hindered amine photo-stabilizers.

Among these organic stabilizers, hindered phenol antioxidants, phosphorus processed heat stabilizers and combinations thereof are more preferred.

The organic stabilizer is used in an amount of preferably from 0.001 to 1 part by weight, based on 100 parts by weight of the polyamide resin.

Further, it is permitted that a known additive other than those mentioned above, which may be safely added to the polyamide resin, is added in an amount of less than 10 parts by weight, based on 100 parts by weight of the polyamide resin.

The polyphenylene ether (B) that can be used in the present invention is a homopolymer and/or a copolymer having a structural unit of the following formula,

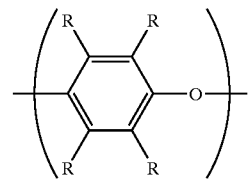

wherein O represents an oxygen atom, and each R independently represents hydrogen, halogen, primary or secondary lower alkyl, phenyl, haloalkyl, aminoalkyl, hydrocarbyloxy or halohydrocarbyloxy in which the halogen atom and the oxygen atom are separated from each other by at least two carbon atoms.

Specific examples of the polyphenylene ether (B) in the present invention include poly(2,6-dimethyl-1,4-phenylene ether), poly(2-methyl-6-ethyl-1,4-phenylene ether), poly(2- methyl-6-phenyl-1,4-phenylene ether) and poly(2,6-dichloro-1,4-phenylene ether), etc. In addition, there are mentioned polyphenylene ether copolymers, such as a copolymer of 2,6-dimethylphenol and another phenol (for example, a copolymer of 2,6-dimethylphenol and 2,3,6-trimethylphenol, and a copolymer of 2,6-dimethylphenol and 2-methyl-6-butylphenol, as described in JP-B-52-17880).

Among these, particularly preferred polyphenylene ethers include poly(2,6-dimethyl-1,4-phenylene ether), a copolymer of 2,6-dimethylphenol and 2,3,6-trimethylphenol and a mixture thereof.

A method for producing the polyphenylene ether (B) used in the present invention is not particularly limited as far as it is already known. For example, the production processes described in U.S. Pat. Nos. 3,306,874; 3,306,875; 3,257,357 and 3,257,358; JP-A-50-51197, JP-B-52-17880 and JP-B-63-152628 are included.

The polyphenylene ether (B) that can used in the present invention has a reduced viscosity ($\eta$ sp/c: measured in a 0.5 g/dl chloroform solution at 30° C.) ranging preferably from 0.15 to 0.70 dl/g, more preferably from 0.20 to 0.60 dl/g, and much more preferably from 0.40 to 0.55 dl/g.

In the present invention, a mixture of two or more polyphenylene ethers having different reduced viscosity can be used without any problem. Examples thereof include, but are not limited to, a mixture of a polyphenylene ether having a reduced viscosity of 0.45 dl/g or less and a polyphenylene ether having a reduced viscosity of 0.50 dl/g or more, and a mixture of a low molecular weight polyphenylene ether having a reduced viscosity of 0.40 dl/g or less and a polyphenylene ether having a reduced viscosity of 0.50 dl/g or more.

Moreover, the polyphenylene ether (B) that can be used in the present invention may contain residual organic solvent resulting from a polymerization solvent in an amount of less than 5 weight % based on 100 parts by weight of the polyphenylene ether. Since it is difficult to completely remove the organic solvent resulting from a polymerization solvent through a drying step after the completion of the polymerization, it is usual that the organic solvent remains in the polymer in an amount of from several hundred ppm to several %. The organic solvent referred to here resulting from a polymerization solvent includes at least one member selected from toluene, xylene including various isomers, ethylbenzene, alcohol having 1 to 5 carbon atoms, chloroform, dichloromethane, chlorobenzene and dichlorobenzene.

Further, it is permitted that the polyphenylene ether (B) that can be used in the present invention is a polyphenylene ether modified in its entirety or in part.

The modified polyphenylene ether referred to here is a polyphenylene ether modified with at least one modifying compound having at least one carbon-carbon double or triple bond and at least one carboxylic acid group, acid anhydride group, amino group, hydroxyl group or glycidyl group in its molecular structure.

The processes for producing the modified polyphenylene ether include, for example, (1) a process comprising reacting a polyphenylene ether with a modifying compound in the presence or absence of a radical initiator at a temperature of 100° C. or more but lower than the glass transition temperature of the polyphenylene ether while keeping the polyphenylene ether non-melted, (2) a process comprising melt-kneading a polyphenylene ether and a modifying compound with or without the presence of a radical initiator, at a temperature in the range from the glass transition temperature of the polyphenylene ether to 360° C., and (3) a process comprising reacting a polyphenylene ether with a modifying compound in a solution in the presence or absence of a radical initiator at a temperature lower than the glass transition temperature of the polyphenylene ether.

Although any of these processes may be used, processes (1) and (2) are preferably used.

Next, at least one modifying compound having at least one carbon-carbon double or triple bond and at least one carboxylic acid group, acid anhydride group, amino group, hydroxyl group or glycidyl group in its molecular structure is described in detail as follows.

Examples of the modifying compound having a carbon-carbon double bond and a carboxylic acid or an acid anhydride group in the molecule at the same time include maleic acid, fumaric acid, chloromaleic acid, cis-4-cyclohexene-1,2-dicarboxylic acid and their acid anhydrides. Of these, preferred are fumaric acid, maleic acid and maleic anhydride, and particularly preferred are fumaric acid and maleic anhydride.

Further, it is possible to use a compound wherein one or two carboxylic acid group(s) in these unsaturated dicarboxylic acids is(are) formed into an ester(s).

Examples of the modifying compound having a carbon-carbon double bond and a glycidyl group in the molecule at the same time include allyl glycidyl ether, glycidyl acrylate, glycidyl methacrylate and epoxydized natural fats and oils. Of these, particularly preferred are glycidyl acrylate and glycidyl methacrylate.

Examples of the modifying compound having a carbon-carbon double bond and a hydroxyl group in the molecule at the same time include unsaturated alcohols of the general formula, $C_nH_{2n-3}OH$ (n is a positive integer), such as allyl alcohol, 4-penten-1-ol and 1,4-pentadien-3-ol, and other unsaturated alcohols of the general formula, $C_nH_{2n-5}OH$ or $C_nH_{2n-7}OH$ (n is a positive integer).

The above-mentioned modifying compound may be used singly or in combination of two or more thereof.

In the production of the modified polyphenylene ether, the modifying compound is added in an amount of preferably from 0.1 to 10 parts by weight, and more preferably from 0.3 to 5 parts by weight, based on 100 parts by weight of the polyphenylene ether.

In the production of the modified polyphenylene ether in the presence of a radical initiator, the radical initiator is used in an amount of preferably from 0.001 to 1 part by weight based on 100 parts by weight of the polyphenylene ether.

The addition rate of the modifying compound in the modified polyphenylene ether is preferably from 0.01 to 5 weight %, and more preferably from 0.1 to 3 weight %.

It is permitted that an unreacted modifying compound and/or a polymer of the modifying compound remain(s) in the modified polyphenylene ether.

Further, if desired, it is permitted that a compound having an amide bond and/or an amino group is added at the time of production of the modified polyphenylene ether in order to decrease the modifying compound and/or the polymer of the modifying compound remaining in the modified polyphenylene ether.

The compound having an amide bond referred to here is a compound having an amide bond {—NH—C(=O)—} in its molecular structure. The compound having an amino group is a compound having an amino group {—NH2} at its terminal. Specific examples of these compounds include, but are not limited to, aliphatic amines, such as octylamine, nonylamine, tetramethylenediamine and hexamethylenediamine; aromatic amines, such as aniline, m-phenylenediamine, p-phenylenediamine, m-xylylenediamine and p-xylylenediamine; reaction products between the above-mentioned amines and carboxylic acids, dicarboxylic acids or the like; caprolactams, such as ε-caprolactam; and polyamide resins.

These compounds having an amide bond or an amino group, if added, are used in an amount of preferably 0.001 part by weight or more but less than 5 parts by weight, more preferably 0.01 part by weight or more but less than 1 part by weight, and much more preferably 0.01 part by weight or more but less than 0.1 part by weight, based on 100 parts by weight of the polyphenylene ether.

In addition, in the present invention, it is permitted to add a styrenic thermoplastic resin, provided that the amount thereof is less than 50 parts by weight based on 100 parts by weight of the sum of the polyamide (A) and the polyphenylene ether (B).

Examples of the styrenic thermoplastic resin referred to in the present invention include homopolystyrene, rubber modified polystyrene (HIPS), styrene-acrylonitrile copolymers (AS resin) and styrene-rubbery polymer-acrylonitrile copolymers (ABS resin), etc.

Further, various known stabilizers known to stabilize the polyphenylene ether may be also suitably used. Examples of the stabilizers include metal stabilizers, such as zinc oxide and zinc sulfide; and organic stabilizers, such as hindered phenol stabilizers, phosphorus stabilizers and hindered amine stabilizers. These stabilizers are blended in an amount of less than 5 parts by weight based on 100 parts by weight of the polyphenylene ether.

Furthermore, it is permitted that known additives safely added to the polyphenylene ether are added, provided that the amount thereof is less than 10 parts by weight based on 100 parts by weight of the polyphenylene ether.

Next, the block copolymer (C) that can be used in the present invention is described in detail.

The block copolymer (C) that can be used in the present invention is a copolymer comprising at least one polymer block mainly composed of an aromatic vinyl compound and at least one polymer block mainly composed of a conjugated diene compound.

Specific examples of the aromatic vinyl compound include styrene, α-methylstyrene and vinyltoluene, etc. At least one compound selected therefrom is used. Of these, particularly preferred is styrene.

Specific examples of the conjugated diene compound include butadiene, isoprene, piperylene and 1,3-pentadiene, etc. At least one compound selected therefrom is used. Of these, preferred are butadiene, isoprene and a combination thereof.

When butadiene is used as the conjugated diene for the block copolymer, it is preferred that a 1,2-vinyl content or a total content of a 1,2-vinyl content and a 3,4-vinyl content of the polybutadiene block is from 5 to 80%. More preferably, the content or the total content is from 10 to 50%, and much more preferably from 15 to 40%.

As the block copolymer in the present invention, it is preferred that the block copolymer has a bonding type selected from a-b, a-b-a and a-b-a-b types, wherein a is the polymer block mainly composed of the aromatic vinyl compound and b is the polymer block mainly composed of the conjugated diene compound.

Among these, more preferred are a-b-a and a-b-a-b types, and the most preferred is a-b-a type. It is permitted that it is a mixture of block copolymers having different bonding types.

Further, it is more preferred that the block copolymer of the aromatic vinyl compound and the conjugated diene compound that can be used in the present invention is a hydrogenated block copolymer. The hydrogenated block copolymer is obtained by hydrogenating the block copolymer of the aromatic vinyl compound and the conjugated diene compound, so that the aliphatic double bond in the polymer block mainly composed of the conjugated diene is hydrogenated at a rate within a range of from more than 0 to 100%. The hydrogenation rate in the hydrogenated block copolymer is preferably 50% or more, more preferably 80% or more, and the most preferably 98% or more.

The block copolymer used may be a mixture of the non-hydrogenated block copolymer and the hydrogenated block copolymer.

In the present invention, it is important that the block copolymer used as the component (C) is a mixture of a low molecular weight block copolymer and a high molecular weight block copolymer. More specifically, it is a mixture of a low molecular weight block copolymer (C1) having a number average molecular weight of less than 120,000 and a high molecular weight block copolymer (C2) having a number average molecular weight of 120,000 or more.

When a block copolymer having a number average molecular weight of less than 120,000 only or a block copolymer having a number average molecular weight of 120,000 or more only is used, the effects of the present invention, namely (1) excellent surface appearance, even when the resin is extruded at a high output into a molded piece, (2) retention of impact strength even after heat exposure, and (3) decrease in generation of foreign matter at the time of production, cannot be attained.

The number average molecular weight referred to in the present invention is obtained by a gel permeation chromatography measurement apparatus (GPC SYSTEM 21, manufactured by Showa Denko K.K.) with an ultraviolet spectral detector (UV-41, manufactured by Showa Denko K.K.) under the conditions, solvent: chloroform; temperature: 40° C.; column: sample side (K-G, K-800RL, K-800R), reference side (K-805L×2); flow: 10 ml/min; measurement wavelength: 254 nm; pressure: 15 to 17 kg/cm$^2$, and converting the measurement based on the polystyrene standard. At times, a low molecular weight component owing to catalyst deactivation in the course of polymerization may be detected when the number average molecular weight is measured. In such a case, the low molecular weight component is not incorporated in the molecular weight calculation. Usually, an accurate calculated molecular weight distribution (weight average molecular weight/number average molecular weight) ranges from 1.0 to 1.1.

The weight ratio of the component (C1) and the component (C2), namely (C1)/(C2), is from 95/5 to 5/95, and preferably from 90/10 to 10/90.

In the present invention, a block copolymer having a number average molecular weight per polymer block mainly composed of the aromatic vinyl compound of 20,000 or more can be used as the component (C1) to obtain an effect that the generation of foreign matter is drastically decreased.

The number average molecular weight per polymer block mainly composed of the aromatic vinyl compound can be determined by the following equation using the above-mentioned number average molecular weight of the block copolymer, $$Mn_{(a)} = \{Mn \times a/(a+b)\}/N$$

wherein Mn(a) is the number average molecular weight per polymer block mainly composed of the aromatic vinyl compound, Mn is the number average molecular weight of the block copolymer, a is the weight % of the total of the polymer block mainly composed of the aromatic vinyl compound in the block copolymer, b is the weight % of the total of the polymer block mainly composed of the conjugated diene compound in the block copolymer, and N is the number of the polymer block mainly composed of the aromatic vinyl compound in the block copolymer.

Further, in the present invention, the content of the polymer block mainly composed of the aromatic vinyl compound in the component (C1) is preferably 55 weight % or more but less than 90 weight %. When the above-defined block copolymer is used as the component (C1), the effect that excellent surface appearance is obtained even when the resin is extruded at a high output into a molded piece can be further increased. In the present invention, such a block copolymer is more suitably used.

Further, in the present invention, by using a mixture of a block copolymer comprising the polymer block mainly composed of the aromatic vinyl compound in an amount of 55 weight % or more but less than 90 weight % (C1-a) and a block copolymer comprising the polymer block mainly composed of the aromatic vinyl compound in an amount of 20 weight % or more but less than 55 weight % (C1-b) as the component (C1), the effect that excellent surface appearance is obtained, even when the resin is extruded at a high output into a molded piece can be further improved.

In this case, the weight ratio of the block copolymer comprising the polymer block mainly composed of the aromatic vinyl compound in an amount of 55 weight % but less than 90 weight % (C1-a) and the block copolymer comprising the polymer block mainly composed of the aromatic vinyl compound in an amount of 20 weight % or more but less than 55 weight % (C1-b), namely (C1-a)/(C1-b), is from 5/95 to 95/5, and more preferably from 30/70 to 90/10.

In the present invention, it is important that the number average molecular weight of the component (C2) is 120,000 or more. A more preferred number average molecular weight of the component (C2) is 170,000 or more but less than 300,000.

The content of the polymer block mainly composed of the aromatic vinyl compound in the component (C2) is not particularly limited, but is preferably 20 weight % or more but less than 55 weight %.

With respect to these aromatic vinyl compound-conjugated diene compound block copolymers, it is permitted to use a mixture of those different from one another in the bonding type, the species of the aromatic vinyl compound, the species of the conjugated diene compound, the 1,2-bond vinyl content, the total of 1,2-bond vinyl content and 3,4-bond vinyl content, the content of the aromatic vinyl compound component or the hydrogenation rate, as long as it is not contrary to the object of the present invention.

Further, it is permitted that the block copolymer used in the present invention is a block copolymer modified in its entirety or in part.

The modified block copolymer referred to herein is a block copolymer modified with at least one modifying compound, having at least one carbon-carbon double or triple bond and at least one carboxylic acid group, acid anhydride group, hydroxyl group or glycidyl group in its molecular structure.

As a process for producing the modified block copolymer, there are mentioned (1) a process comprising melt-kneading a block copolymer and a modifying compound with or without the presence of a radical initiator, at a temperature in the range from the softening point of the block copolymer to 250° C., (2) a process comprising reacting a block copolymer and a modifying compound in a solution in the presence or absence of a radical initiator at a temperature of the softening point of the block copolymer or lower, and (3) a process comprising carrying out reaction between a block copolymer and a modifying compound in the presence or absence of a radical initiator at a temperature of the softening point of the block copolymer or lower while keeping both non-melted. Although any of these processes may be used, preferred is the process (1), and the most preferred is the process (1) wherein the reaction is carried out in the presence of a radical initiator.

With respect to the at least one modifying compound having at least one carbon-carbon double or triple bond and at least one carboxylic acid group, acid anhydride group, amino group, hydroxyl group or glycidyl group in its molecular structure, those described hereinabove in connection with the modified polyphenylene ether can be used.

It is permitted that an oil comprising paraffin as the main component is incorporated into the block copolymer in accordance with the present invention in advance. When the oil comprising paraffin as the main component is incorporated in advance, the processability of the resin composition can be improved.

In this case, the oil comprising paraffin as the main component is incorporated in an amount of preferably from 1 to 70 parts by weight based on 100 parts by weight of the block copolymer.

The oil comprising paraffin as the main component referred to herein is a mixture of, hydrocarbon compounds having a weight average molecular weight of from 500 to 10,000, which is, a combination of three, i.e. an aromatic ring-bearing compound, a naphthene ring-bearing compound and a paraffin compound, wherein the content of the paraffin compound is 50 weight % or more.

A more preferred oil comprising paraffin as the main component is the one composed of 50 to 90 weight % of a paraffin compound, 10 to 40 weight % of a naphthene ring-bearing compound and 5 weight % or less of an aromatic ring-bearing compound.

Such an oil comprising paraffin as the main component is commercially available. Examples thereof include PW380 manufactured by Idemitsu Kosan Co., Ltd. and so on.

Further, in the present invention, it is permitted that a compatibilizer is added during the production of the composition. The main purpose of using a compatibilizer is to improve the physical pro-perties of the polyamide-polyphenylene ether mixture. The compatibilizer that can be used in the present invention is a polyfunctional compound interactive with the polyphenylene ether, the polyamide or both of them. The interaction may be not only chemical (for example, graft formation) but also physical (for example, alteration of surface characteristics of a dispersed phase).

In any case, the obtained polyamide-polyphenylene ether mixture can exhibit improved compatibility.

Examples of the compatibilizer that can be used in the present invention are described in, for example, JP-A-8-8869 and JP-A-9-124926. All of these known compatibilizers can be used alone or in combination.

Among these various compatibilizers, examples of particularly preferred compatibilizers include maleic acid, maleic anhydride and citric acid.

The compatibilizer in the present invention is used in an amount of preferably from 0.01 to 20 parts by weight, and more preferably from 0.1 to 10 parts by weight, based on 100 parts by weight of the polyamide-polyphenylene ether mixture.

Furthermore, in the present invention, by adding a surfactant as a component (D), the Izod impact strength retention of the resin composition after heat exposure can be further improved and the generation of foreign matter at the time of production can be further inhibited.

The surfactant that can be used in the present invention includes nonionic, cationic, anionic and amphoteric ones. Examples of these surfactants include those known and disclosed in, for example, "13,901 Chemicals", pages 1250 to 1279 (published on Jan. 23, 2001, by Kagaku Kogyo Nippo Co., Ltd.).

The nonionic surfactant is the one having no group capable of dissociating into an ion in its aqueous solution, and includes a monohydric alcohol, phenol, thiol, saturated carboxylic acid and alkylamide, and a condensate of a reaction derivative thereof with ethylene oxide. Typical examples of the condensate include poly(oxyethylene) p-t-octylphenyl ether, poly(oxyethylene) alkylphenyl ether, poly(oxyethylene)-n-alkylether, poly(oxyethylene)-sec-alkylether, poly(oxyethylene) mercaptan, poly(oxyethylene) alkanamide, and poly(oxyethylene) esters of saturated carboxylic acids, etc.

The cationic surfactant is capable of dissociating into ions in its aqueous solution, wherein a cation portion thereof exhibits a surface activity, and includes, for example, an aliphatic amine salt and its quaternary ammonium salt, an aromatic quaternary ammonium salt and a heterocyclic quaternary ammonium salt. Typical examples thereof include monoalkylamine salts, dialkylamine salts, trialkylamine salts, aliphatic quaternary ammonium salts, halogenated benzethoniums, pyridinium salts and imidozolinium salts.

The anionic surfactant is capable of dissociating into ions in its aqueous solution, wherein an anion portion thereof exhibits a surface activity, and includes, for example, carboxylic acid salts, sulfonic acid salts, sulfuric acid ester salts and phophoric acid ester salts. Specific examples thereof include aliphatic soaps, N-acylamino acids and salts thereof, alkyl ether carboxylic acid salts, acylated peptides, alkylsulfonic acid salts, alkylbenzene-sulfonic acid salts, alkylnaphthalenesulfonic acid salts, naphthalenesulfonic acid salt-formalin polycondensates, dialkylsulfosuccinic acid ester salts, alkylsulfoacetic acid salts, α-olefinsulfonic acid salts, N-acylsulfonic acid salts, sulfated oils, alkylsulfuric acid salts, secondary alkylsulfuric acid salts, primary higher alcohol ethoxysulfates, secondary higher alcohol ethoxysulfates, sulfuric acid salts of polyoxyethylene alkylphenyl ether, sulfuric acid salts of monofatty acid glyceryl, sulfuric acid esters of aliphatic alkylolamides, alkyl ether phosphoric acid ester salts and alkylphosphoric acid ester salts.

The amphoteric surfactant is the one simultaneously having one or more cationic functional groups and one or more anionic functional groups. Typical examples thereof include alkyldimethylbetaines, sulfobetaines, aminocarboxylic acid salts, imidazolinium betaines and lecithin, etc.

Among these surfactants, the most preferably used is the anionic surfactant. Of the anionic surfactants, sulfonic acid salts are preferred. More preferred are alkylsulfonic acid salts, and the most preferred are secondary alkylsulfonic acid sodium salts.

Naturally, it is permitted that the surfactant is used singly or in a combination of two or more.

In the present invention, the surfactant is used in an amount of preferably less than 10 parts by weight, more preferably less than 5 parts by weight, and much more preferably less than 3 parts by weight, based on 100 parts by weight of the sum of the components (A) to (C). When the amount of the surfactants is 10 parts by weight or more, the heat resistance of the composition greatly deteriorates.

In the present invention, it is permitted that an additive component other than the components mentioned above are added as far as the effects of the components mentioned above are not impaired.

Examples of the additive components are other thermoplastic resins, such as polyesters and polyolefins; inorganic fillers (for example, talc, kaolin, xonotlite, wallastonite, titanium oxide, potassium titanate, carbon fiber and glass fiber); silane coupling agents known and used for the purpose of increasing the compatibility of an inorganic filler and a resin; flame retardants (for example, halogenated resins, silicone flame retardants, magnesium hydroxide, aluminum hydroxide, organic phosphoric acid ester compounds, ammonium polyphosphate and red phosphorus); fluorine based polymers exhibiting a drop prevention effect; plasticizers (for example, oils, low molecular weight polyolefins, polyethylene glycol and fatty acid esters); flame retarding assistants, such as antimony trioxide; coloring agents, such as carbon black; conductivity-imparting materials, such as carbon fiber, conductive carbon black and carbon fibril; antistatic agents; various peroxides; antioxidants; ultraviolet absorbers and photo-stabilizers.

These additive components are added in a total amount not exceeding 100 parts by weight based on 100 parts by weight of the sum of the components (A) to (C).

Specific examples of a processing machine used for the production of the composition in accordance with the present invention include, for example, a single screw extruder, a twin screw extruder, a roll, a kneader, the Brabender Plastograph and the Banbury mixer of these, a twin screw extruder is preferred, and particularly, the most preferred is a twin screw extruder equipped with an upstream feed opening and more than one downstream feed opening.

In this case, the melt-kneading temperature is not particularly limited. Usually, considering the kneading state, etc., the temperature is arbitrarily selected from a range of from 240 to 360° C. in order to obtain a desired composition.

More specifically, the production method in the present invention includes:

(1) a method wherein a block copolymer and a polyphenylene ether are fed from the upstream feed opening and melt-kneaded, and thereafter a polyamide is fed from the downstream feed opening and melt-kneaded;

(2) a method wherein a part of a block copolymer and a polyphenylene ether are supplied from the upstream feed opening and melt-kneaded, and thereafter a polyamide and the remaining block copolymer are fed from the downstream feed opening and melt-kneaded; and (3) a method wherein a polyphenylene ether is supplied from the upstream feed opening and melt-kneaded, and thereafter a block copolymer and a polyamide are fed from the downstream feed opening and melt-kneaded, using a twin screw extruder equipped with an upstream feed opening and one or more downstream feed openings. Any of the methods mentioned above may be used.

The thus obtained composition in accordance with the present invention can be molded into molded products used for various parts according to a conventional molding method, such as injection-molding.

Examples of such various parts are motorbike or car electrical device parts, such as a relay box material; IC tray materials and chassis for various disk players; electric and electronic parts, such as cabinets; OA parts and machinery parts, such as various computers and their peripheral devices; exterior parts, such as motorbike cowls and car bumpers, fenders, door panels, various moldings, emblems, outer door handles, door mirror housings, wheel caps, roof rails and their staying materials and spoilers; and interior parts, such as instrument panels, console boxes and trim.

The present invention is described in more detail with reference to Examples and Comparative Examples as follows.

(Materials Used)

Polyamide as the Component (A) (Hereinafter Referred to as PA)

Polyamide 6, 6 resin
Number average molecular weight=13,700
Concentration of terminal amino group=30 milli-equivalent/kg
Concentration of terminal carboxyl group= 100 milli-equivalent/kg It contains trace components, a copper heat stabilizer (a complex of copper acetate and potassium iodide) in an amount of 100 ppm (in terms of copper concentration), a slipping agent (metal stearate) in an amount of 800 ppm and an antioxidant, Irganox 1098 (manufactured by Ciba Specialty Chemicals Co.) in an amount of 0.2 weight %.

Polyphenylene Ether as Component (B) (Hereinafter Referred to as PPE)
Reduced viscosity=0.42 dl/g Block Copolymer as Component (C)

(C1-1)
Structure: Polystyrene-hydrogenated polybutadiene-polystyrene
Number average molecular weight=40,000
Number average molecular weight per polystyrene block=6,000
Total content of styrene component=30%
1,2-Vinyl content=38%
Hydrogenation rate of polybutadiene portion= 98% or more (C1-2)
Structure: Polystyrene-hydrogenated polybutadiene-polystyrene
Number average molecular weight=71,000
Number average molecular weight per polystyrene block=11,400
Total content of styrene component=32%
1,2-Vinyl content=40%
Hydrogenation rate of polybutadiene portion= 98% or more (C1-3)
Structure: Polystyrene-hydrogenated polybutadiene-polystyrene
Number average molecular weight=76,000
Number average molecular weight per polystyrene block=11,000
Total content of styrene component=29%
1,2-Vinyl content=32%
Hydrogenation rate of polybutadiene portion= 98% or less (C1-4)
Structure: Polystyrene-hydrogenated polybutadiene-polystyrene
Number average molecular weight=77,000
Number average molecular weight per polystyrene block=25,800
Total content of styrene component=67%
1,2-Vinyl content=36%
Hydrogenation rate of polybutadiene portion= 98% or more (C1-5)
Structure: Polystyrene-hydrogenated polybutadiene-polystyrene
Number average molecular weight=115,000
Number average molecular weight per polystyrene block=34,500
Total content of styrene component=60%
1,2-Vinyl content=35%
Hydrogenation rate of polybutadiene portion= 98% or more (C1-6)
Structure: Polystyrene-hydrogenated polyisoprene-polystyrene
Number average molecular weight=80,000
Number average molecular weight per polystyrene block=8,000
Total content of styrene component=20%
1,2-Vinyl content=55%
Hydrogenation rate of polyisoprene portion= 98% or more (C2-1)
Structure: Polystyrene-hydrogenated polybutadiene-polystyrene
Number average molecular weight=170,000
Number average molecular weight per polystyrene block=29,800
Total content of styrene component=35%
1,2-Vinyl content=38%
Hydrogenation rate of polybutadiene portion= 98% or more
Contains paraffin oil in an amount of 35 weight %.

(C2-2)
Structure: Polystyrene-hydrogenated polybutadiene-polystyrene
Number average molecular weight=246,000
Number average molecular weight per polystyrene block=40,600
Total content of styrene component=33%
1,2-Vinyl content=33%
Hydrogenation rate of polybutadiene portion= 98% or more (C2-3)
Structure: Polystyrene-hydrogenated polyisoprene-polystyrene
Number average molecular weight=170,000
Number average molecular weight per polystyrene block=25,500
Total content of styrene component=30%
Hydrogenation rate of polyisoprene portion= 98% or more Surfactant as Component (D)
(D-1) Sodium Secondary Alkanesulfonate
Hostapur SAS93 [manufactured by Clariant Japan Co., Ltd.]
(D-2) Sodium Methyltaurine Fatty Acid
Hostapon T Powder [manufactured by Clariant Japan Co., Ltd.]

Various evaluation tests shown in the Examples and Comparative Examples were carried out as follows.

(1) Evaluation of Izod Impact Strength Retention after Heat Exposure

Using a gear oven manufactured by Tabai, a test piece having a thickness of 3.2 mm was subjected to heat exposure test at 120° C. for 500 hours. The test piece taken out was allowed to stand under an atmosphere of ambient temperature of 23° C. for 48 hours in an aluminum desiccating bag. Thereafter, a 3.2 mm thick notched Izod impact strength of the test piece was measured according to ASTM D-256. Izod impact strength retention [%] from the composition without heat exposure was calculated by the following equation.

Incidentally, a number expressed by the sign n was 5, and the results thereof were averaged to obtain the retention.

Izod impact strength retention=[(Izod–A)/(Izod–B)]×100

In the equation, Izod–A stands for Izod impact strength after the heat exposure and Izod–B stands for Izod impact strength before the heat exposure.

(2) Evaluation of Surface Appearance of Molded Product

Using a plate-like molded piece having a width of 50 mm, a length of 90 mm and a thickness of 2.5 mm, the surface appearance thereof was visually observed. Both of the 50 mm wide surface and 90 mm long surface were observed, and the following evaluation on a one-to-five scale was carried out on the basis of a ratio of a gloss area to the total area of both surfaces.

Incidentally, in order to exclude any influences from molding conditions, all moldings were carried out under the same conditions.

5 points: Gloss was observed across the entire surfaces of the molded product.

4 points: Gloss was observed on about 75% of the area of the molded product.

3 points: Gloss was observed on about 50% of the area of the molded product.

2 points: Gloss was observed on about 25% of the area of the molded product.

1 point: Almost no gloss was observed on the molded product.

(3) Evaluation of Foreign Matter (Black Spot) Generation

Using a compression-molding machine set at 300° C., the resin was press-molded into a disc-like product having a diameter of 300 mm and a thickness of 2 mm. The size and the number of black spots were observed across the entire surface of the obtained disc-like molded piece, and numerically expressed on the basis of the following judgment criteria.

Black spot having a diameter of 1.0 mm: 10 points/black spot

Black spot having a diameter of 0.5 mm or more but less than 1.0 mm: 5 points/black spot Black spot having a diameter of 0.1 mm or more but less than 0.5 mm: 1 point/black spot Black spot having a diameter of 0.1 mm or more: 0.1 point/black spot Incidentally, in order to prevent the resin from closely adhering to a metal mold at the time of compression-molding, a 0.2 mm thick Teflon® sheet was sandwiched between the resin and the metal mold, to carry out the molding.

EXAMPLES 1 TO 6 AND COMPARATIVE EXAMPLES 1 AND 2

The cylinder temperature of a twin screw extruder with a feed opening in the upstream and another feed opening in the middle of the extruder [ZSK-58MC, manufactured by WERNER & PFLEIDERER, Germany] was set at 320° C. from the feed opening in the upstream (hereinafter referred to as Main-F) to the feed opening in the middle (hereinafter referred to as Side-F) and at 280° C. from the Side-F to a die.

A uniform mixture of 30 parts by weight of PPE, 1 part by weight of maleic anhydride as a compatibilizer and block copolymer(s) in a proportion as shown in Table 1 was fed from the Main-F, and PA in a proportion shown in Table 1 was fed from the Side-F. The components were melt-kneaded to obtain a pellet.

Therein, a screw rotating number was controlled to 900 revolution/min, and the output was varied to be 360 kg/h, 540 kg/h, 720 kg/h and 900 kg/h to obtain each pellet under respective conditions.

The pellet thus-obtained under said condition was formed into a sample for foreign matter measurement.

Using an injection-molding machine [IS-80 EPN, manufactured by Toshiba Machine Co., Ltd.], wherein the cylinder temperature and mold temperature were set to 290° C. and 80° C., respectively, the pellet obtained was molded, to obtain a molded piece to be used for various measurements.

Using the molded piece obtained, the surface appearance was evaluated and Izod impact strength retention was measured, provided that for the measurement of the Izod impact strength retention, the pellet obtained under the condition of the output of 540 kg/h was used.

The results of the measurements are shown in Table 1.

EXAMPLES 7 To 11 AND COMPARATIVE EXAMPLES 3 AND 4

A resin composition was produced as in Example 1, except that a uniform mixture of 36 parts by weight of PPE, 1 part by weight of maleic anhydride, block copolymer(s) in a proportion shown as in Table 2 and 0.3 part by weight of zinc oxide was fed from the Main-F, and a uniform mixture of PA in a proportion shown in Table 2 and 1 part by weight of maleic anhydride-modified ethyleneoctene copolymer [FUSABOND MN493D, manufactured by DuPont] was fed from the Side-F. Various characteristic properties were measured and the results thereof are shown in Table 2.

EXAMPLES 12 TO 14

A resin composition was produced as in Example 1, except that a uniform mixture of 36 parts by weight of PPE, 1 part by weight of maleic anhydride, block copolymer(s) in a proportion as shown in Table 3 and 0.3 part by weight of zinc oxide was fed from the Main-F, and a uniform mixture of PA and a surfactant in each proportion shown in Table 3 and 1 part by weight of maleic anhydride-modified ethylene-octene copolymer [FUSABOND MN493D, manufactured by DuPont] was fed from the Side-F. Various characteristic properties were measured and the results thereof are shown in Table 3.

INDUSTRIAL APPLICABILITY

According to the composition of the present invention, an excellent surface appearance can be obtained even when it is extruded into a molded piece at a high output, Izod impact strength retention after heat exposure can be considerably improved, and moreover the amount of foreign matter (black spot) at the time of production can be considerably decreased, as compared with the prior art.

Therefore, the composition of the present invention can be more advantageously applied for electrical device parts for cars or the like, chassis, electric and electronic parts, OA parts, machinery parts, exterior parts and interior parts.

TABLE 1

|  |  | Example 1 | Example 2 | Example 3 | Example 4 | Example 5 | Example 6 | Comparative Example 1 | Comparative Example 2 |
|---|---|---|---|---|---|---|---|---|---|
| Composition (parts by weight) *1 | A1 | 60 | 60 | 60 | 60 | 60 | 60 | 60 | 60 |
|  | B1 | 30 | 30 | 30 | 30 | 30 | 30 | 30 | 30 |
|  | C1-1 | 6 | 5 | 3 |  |  | 2 | 10 |  |
|  | C1-2 |  |  |  |  | 5 |  |  |  |
|  | C1-4 |  |  |  | 3 |  |  |  |  |
|  | C2-1 | 4 | 5 | 7 | 7 | 5 | 8 |  | 10 |
| Izod impact strength retention [%] |  | 87 | 80 | 74 | 76 | 85 | 68 | 69 | 60 |
| Appearance of molded product | 360 kg/h | 5 | 5 | 5 | 5 | 5 | 5 | 5 | 5 |
|  | 540 kg/h | 5 | 5 | 5 | 5 | 5 | 5 | 3 | 1 |
|  | 720 kg/h | 3 | 3 | 3 | 5 | 4 | 3 | 1 | 1 |
|  | 900 kg/h | 2 | 1 | 1 | 3 | 2 | 1 | 1 | 1 |
| Foreign matter (black spot) | 1 mm or more | 0 | 0 | 0 | 0 | 0 | 0 | 0 | 5 |
|  | 0.5 to 1.0 mm | 1 | 1 | 0 | 0 | 0 | 1 | 8 | 26 |
|  | 0.1 to 0.5 mm | 18 | 16 | 23 | 10 | 26 | 27 | 37 | 65 |
|  | less than 0.1 mm | 39 | 38 | 35 | 21 | 45 | 44 | 52 | 166 |
|  | Total points | 26.9 | 24.8 | 26.5 | 12.1 | 30.5 | 36.4 | 82.2 | 261.6 |

*1 part by weight is based on 100 parts by weight of the sum of (A), (B) and (C).

TABLE 2

|  |  | Example 7 | Example 8 | Example 9 | Example 10 | Example 11 | Example 12 | Comparative Example 3 | Comparative Example 4 |
|---|---|---|---|---|---|---|---|---|---|
| Composition (parts by weight) *1 | A1 | 53 | 53 | 53 | 53 | 53 | 53 | 53 | 53 |
|  | B1 | 36 | 36 | 36 | 36 | 36 | 36 | 36 | 36 |
|  | C1-3 |  |  |  | 3 | 3 |  |  |  |
|  | C1-4 |  | 3 |  |  | 3 | 3 |  | 3 |
|  | C1-5 | 3 |  | 3 | 3 |  |  |  | 8 |
|  | C1-6 |  |  |  |  |  | 3 |  |  |
|  | C2-2 | 8 | 8 |  | 5 | 5 | 5 | 8 |  |
|  | C2-3 |  |  | 8 |  |  |  | 3 |  |
| Izod impact strength retention [%] |  | 79 | 83 | 80 | 87 | 88 | 85 | 62 | 48 |
| Appearance of molded product | 360 kg/h | 5 | 5 | 5 | 5 | 5 | 5 | 5 | 5 |
|  | 540 kg/h | 5 | 5 | 5 | 5 | 5 | 5 | 2 | 5 |
|  | 720 kg/h | 4 | 4 | 3 | 4 | 5 | 5 | 2 | 2 |
|  | 900 kg/h | 3 | 3 | 3 | 3 | 4 | 4 | 1 | 1 |
| Foreign matter (black spot) | 1 mm or more | 0 | 0 | 0 | 0 | 0 | 0 | 1 | 2 |
|  | 0.5 to 1.0 mm | 1 | 0 | 0 | 1 | 1 | 2 | 8 | 10 |
|  | 0.1 to 0.5 mm | 12 | 16 | 11 | 12 | 16 | 14 | 37 | 43 |
|  | less than 0.1 mm | 27 | 38 | 23 | 35 | 23 | 36 | 52 | 98 |
|  | Total points | 19.7 | 19.8 | 13.3 | 20.5 | 23.3 | 27.6 | 92.2 | 122.8 |

*1 part by weight is based on 100 parts by weight of the sum of (A), (B) and (C).

TABLE 3

|  |  | Example 12 | Example 13 | Example 14 |
|---|---|---|---|---|
| Composition (parts by weight) *1 | A1 | 53 | 53 | 53 |
|  | B1 | 36 | 36 | 36 |
|  | C1-3 |  |  | 3 |
|  | C1-5 | 3 | 3 | 3 |
|  | C2-2 | 8 | 8 | 5 |
|  | D-1 | 1 | 5 |  |
|  | D-2 |  |  | 3 |
| Izod impact strength retention [%] |  | 92 | 93 | 98 |

TABLE 3-continued

|  |  | Example 12 | Example 13 | Example 14 |
|---|---|---|---|---|
| Appearance of molded product | 360 kg/h | 5 | 5 | 5 |
|  | 540 kg/h | 5 | 5 | 5 |
|  | 720 kg/h | 5 | 5 | 5 |
|  | 900 kg/h | 5 | 5 | 5 |
| Foreign matter (black spot) | 1 mm or more | 0 | 0 | 0 |
|  | 0.5 to 1.0 mm | 0 | 0 | 0 |
|  | 0.1 to 0.5 mm | 8 | 5 | 9 |

TABLE 3-continued

|  | Example 12 | Example 13 | Example 14 |
|---|---|---|---|
| less than 0.1 mm | 19 | 12 | 35 |
| Total points | 9.9 | 6.2 | 12.5 |

*1 part by weight is based on 100 parts by weight of the sum of (A), (B) and (C).

What is claimed is:

1. A thermoplastic resin composition comprising
   (A) 50 to 90 parts by weight of a polyamide,
   (B) 50 to 10 parts by weight of a polyphenylene ether, and
   (C) 1 to 35 parts by weight of a hydrogenated block copolymer of a block copolymer comprising at least two polymer blocks mainly composed of an aromatic vinyl compound and at least one polymer block mainly composed of a conjugated diene compound, wherein the weight is based on 100 parts by weight of the sum of (A) and (B),
   wherein the component (C) is a mixture of a block copolymer having a number average molecular weight of less than 120,000 (C1) and a block copolymer having a number average molecular weight of 170,000 or more and less than 300,000 (C2).

2. The thermoplastic resin composition according to claim 1, wherein the weight ratio of the component (C1) and the component (C2), (C1)/(C2), ranges from 95/5 to 5/95.

3. The thermoplastic resin composition according to claim 1, wherein the polymer block mainly composed of an aromatic vinyl compound in the component (C1) has a number average molecular weight per block of 20,000 or more.

4. The thermoplastic resin composition according to claim 1, wherein the component (C1) is a block copolymer comprising the polymer block mainly composed of an aromatic vinyl compound in an amount of 55 weight % or more but less than 90 weight %.

5. The thermoplastic resin composition according to claim 1, wherein the component (C1) is a mixture of a block copolymer comprising the polymer block mainly composed of an aromatic vinyl compound in an amount of 55 weight % or more but less than 90 weight % and a block copolymer comprising the polymer block mainly composed of an aromatic vinyl compound in an amount of 20 weight % or more but less than 55 weight %.

6. The thermoplastic resin composition according to claim 5, wherein the weight ratio in the component (C1) of the block copolymer comprising the polymer block mainly composed of an aromatic vinyl compound in an amount of 55 weight % or more but less than 90 weight % and the block copolymer comprising the polymer block mainly composed of an aromatic vinyl compound in an amount of 20 weight % or more but less than 55 weight % ranges from 5/95 to 95/5.

7. Thermoplastic resin composition according to claim 1, further comprising a surfactant as a component (D) in an amount of 1 part by weight or more and less than 10 parts by weight based on 100 parts by weight of the sum of the components (A) to (C).

8. The thermoplastic resin composition according to claim 7, wherein the surfactant as the component (D) is a metal salt of an alkylsulfonic acid.

9. An injection-molded product, comprising the thermoplastic resin composition according to claim 1.

* * * * *